H. BILGRAM.
AUTOMATIC BRAKING DEVICE FOR COMPENSATION GEARS OF AUTOMOBILES AND OTHER SIMILAR VEHICLES.
APPLICATION FILED NOV. 10, 1917.
1,277,837.
Patented Sept. 3, 1918.
2 SHEETS—SHEET 1.
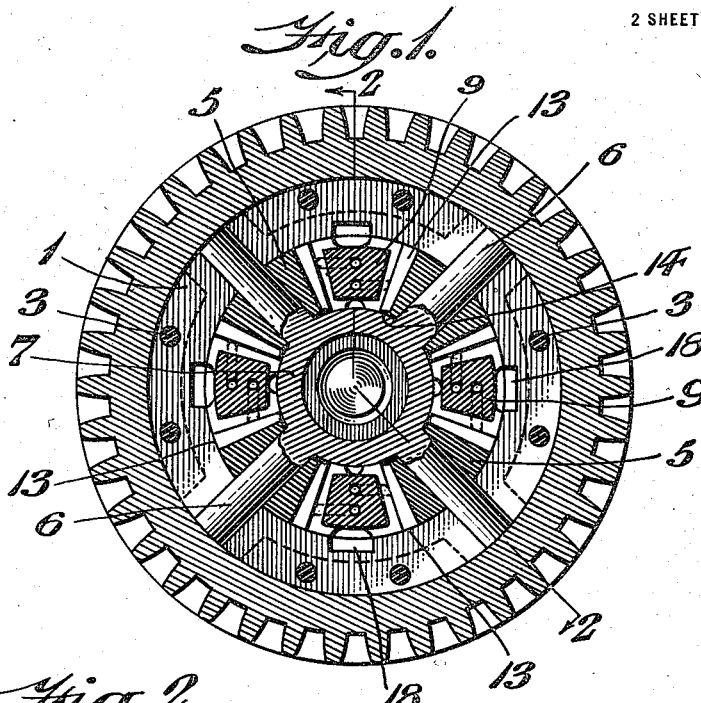
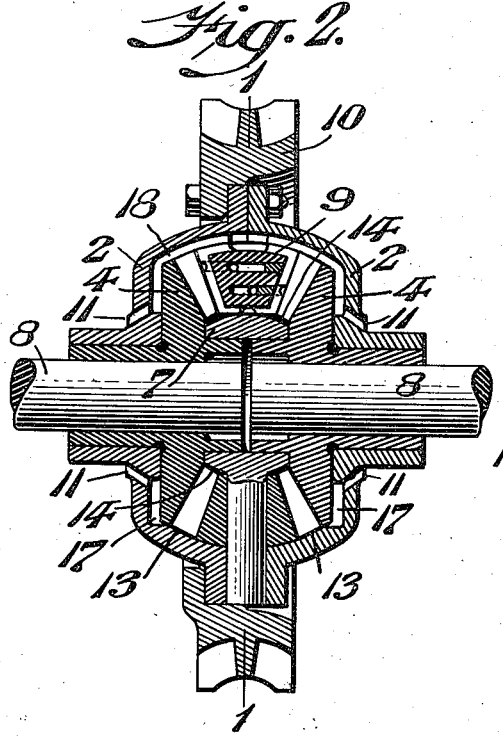
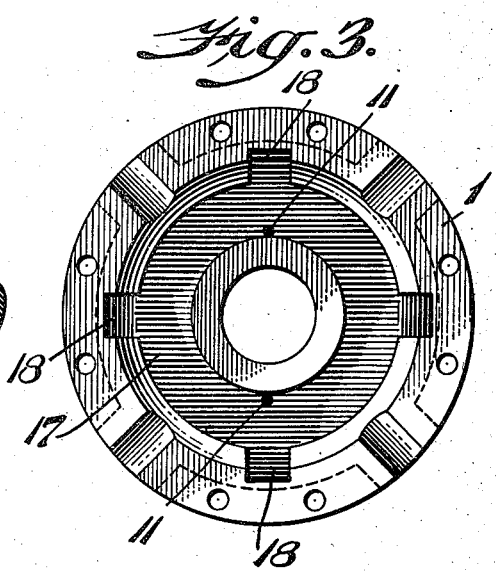
Inventor
Hugo Bilgram
By Diedersheim + Fairbanks
Attorney H. BILGRAM.
AUTOMATIC BRAKING DEVICE FOR COMPENSATION GEARS OF AUTOMOBILES AND OTHER SIMILAR VEHICLES.
APPLICATION FILED NOV. 10, 1917.
1,277,837.
Patented Sept. 3, 1918.
2 SHEETS—SHEET 2.
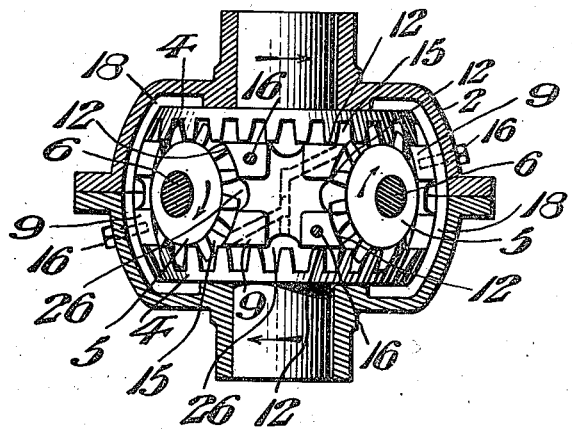
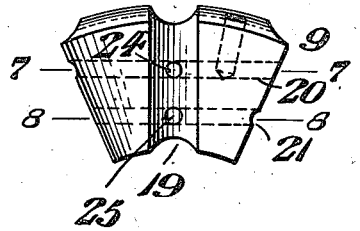
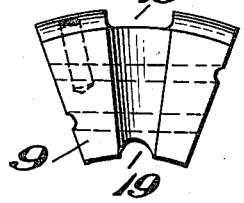
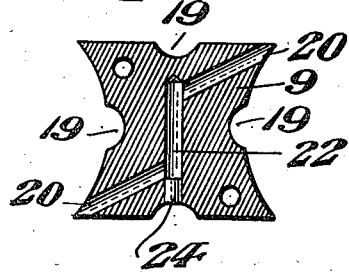
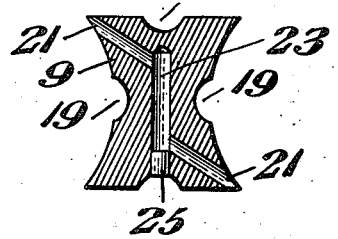
Inventor
Hugo Bilgram.
By Niedersheim & Fairbanks
Attorney

UNITED STATES PATENT OFFICE.

HUGO BILGRAM, OF PHILADELPHIA, PENNSYLVANIA.

AUTOMATIC BRAKING DEVICE FOR COMPENSATION-GEARS OF AUTOMOBILES AND OTHER SIMILAR VEHICLES.

1,277,837.  Specification of Letters Patent.  Patented Sept. 3, 1918.

Application filed November 10, 1917. Serial No. 201,214.

*To all whom it may concern:*

Be it known that I, HUGO BILGRAM, a citizen of the United States, residing in the city and county of Philadelphia, State of Pennsylvania, have invented a new and useful Automatic Braking Device for Compensation-Gears of Automobiles and other Similar Vehicles, of which the following is a specification.

My invention relates to improvements in compensation gears of automobiles and has the object of enabling power to be applied to one of the two rear wheels of an automobile if the other rear wheel happens for any reason to be free to rotate. The method by which I attain this result is to apply an automatic braking device to the combination of compensation gears which becomes operative whenever these gears get in rapid relative rotation. This is accomplished by inclosing the teeth as they approach the point of mesh so as to form pockets or inclosures into which oil is carried, and this oil being unable to escape except through small leaks reacts against the motion of the toothed wheels.

The device is an improvement on the invention described and claimed in a former application, Serial No. 179,126, filed July 7th, 1917. The present invention consists in adapting the said invention to compensation gears consisting of two bevel gears and three or more pinions.

The invention is satisfactorily illustrated in the accompanying drawing, but the important instrumentalities thereof may be varied, and so it is to be understood that the invention is not limited to the specific details shown and described, as long as they are within the spirit or scope of the claims.

Figure 1 represents a diametrical section on line 1—1 Fig. 2 of the automatic braking device embodying my invention.

Fig. 2 represents a cross section thereof on line 2—2 Fig. 1.

Fig. 3 represents a side elevation of one half of the housing employed.

Fig. 4 represents a cross section of the housing with the gear wheels and tooth guards in position.

Fig. 5 represents a front view of one of the tooth guards on a larger scale.

Fig. 6 represents a side view of the same.

Fig. 7 represents a cross section of a guard on line 7—7 Fig. 5.

Fig. 8 represents a cross section of a guard on line 8—8 Fig. 5.

Similar numerals of reference indicate corresponding parts in the figures.

Referring to the drawings.

1 designates the compensation housing of the device, the same being formed of sections 2—2, connected by the bolts 3—3. In said housing are located the bevel compensation gears 4—4 and the pinions 5—5 mounted as an epicyclic set. The gears 4—4 are pivoted in the housing as shown in Fig. 2, while the pinions 5—5 are carried by the studs 6—6 of the pinion ring 7. The two axles 8—8 each carrying at its far end one of the rear wheels of the automobile not shown in the drawings, are secured each to one of the gears 4—4, so as to transmit motion to said axles. The pinion ring 7 is supported by the inner hubs of the gears 4—4 and is free to rotate on them. The tooth guards 9—9 are located between the pinions 5—5 and are secured by the bolts 16, 16, to the housing 1, to which is attached externally the driving wheel 10 which is shown in the form of a worm wheel. The housing 1 is placed within the power transmission housing not shown in the drawings which latter is partly filled with oil, and for the purpose of keeping the inner housing 1 of the compensation gears also partly filled with oil, the same is provided with oil holes or ducts, 11—11, the outer terminals of which are nearer the center of the axles 8—8 than the inner terminals in order that oil which may be splashed against the outer terminals of any of the ducts will through centrifugal force, be conveyed into the housing.

The tooth spaces of the bevel gears, when near the point of mesh, are completely enveloped or sealed, the seal permitting only a slight leakage, while the same tooth spaces are otherwise in free communication with the inside of the housing 1. To effect this seal, the ends of the teeth are preferably though not necessarily turned spherical. The guards 9—9 are approximately of the form of truncated four sided pyramids with concave sides, closely fitting against but not quite touching the faces of the gear wheels between which they are located. The joints between the guards 9—9 and the faces of the teeth of the bevel gears are shown at 12—12. The inside face of the housing 1 is turned spherical, corresponding with the outside ends of the teeth of the compensation gears fitting closely against but not quite touching these ends, as shown at 13—13. The outside surface of the pinion ring 7 is turned spherical, corresponding with the inside ends of the teeth of the compensation gears, so as to be almost in contact with those ends, as shown at 14—14.

The spherical internal face of the housing 1 is interrupted by circular chambers shown at 17—17 and by transverse canals 18—18, which are in communication with the tooth spaces of the wheels 4—4, 5—5 where the same are not covered by the guards 9—9.

The guards 9—9 are provided with channels 19—19 which are in communication with the canals 18—18 of the housing 1 and with the tooth spaces of the wheels 4—4 and the pinions 5—5 when they are half way between the corners of mesh. There are, moreover, two holes 20—21 in the guards through which diagonally opposite pockets or inclosures 15—15 Fig. 4, formed under the guards are in communication. These communication holes are each produced by three drilling operations, the middle sections 22 and 23 of which are plugged up at the ends 24 and 25, in order to confine communication to diagonally opposite pockets.

The device becomes operative only when the compensation gears are moving in relation to each other. If they are moving relatively as indicated by arrows in Fig. 4 some of the oil with which the housing 1 is partly filled, enters through the several channels into the tooth spaces at 26—26, and is carried into the pockets or inclosures 15—15 formed under the guards, and being unable to escape through the meshing teeth, fills the pockets and exerts a reacting pressure against the approaching teeth. The entrapped oil acts as a brake against the movement of the compensation gears, and the latter, being unable to move freely, will apply force to one rear axle, even though the other be free to rotate.

If for any reason more oil is carried into one pocket than into the one diagonally opposite, a one sided strain against the guard is avoided by a passage of oil through either of the communication holes 20 or 21, as the case may be.

The reacting pressure within the pockets will not entirely prevent the operation of the compensation gears because of the slight leakage of oil at the several seal joints. A slow operation, as if the automobile turns a corner, is possible with but a slight reacting force, but this reacting pressure increases rapidly as the relative motion of the compensation gears increases.

Having thus described my invention what I claim as new and desire to secure by Letters Patent, is:—

1. In an automatic brake for compensation gear wheels of an automobile, in combination with said gear wheels, a housing inclosing the same and adapted to be partly filled with oil, and guards closely fitting against the faces of the teeth of said wheels and having the object of entrapping oil between the intermeshing teeth of said wheels.

2. In an automatic brake for compensation gear wheels of an automobile, in combination with said gear wheels, a housing inclosing the same and adapted to be partly filled with oil, and guards closely fitting against the faces of the teeth of said wheels and provided with channels substantially as shown and described and having the object of entrapping oil between the intermeshing teeth of said wheels.

3. In an automatic brake for compensation gear wheels of an automobile, in combination with said gear wheels, a housing inclosing the same and adapted to be partly filled with oil, and guards closely fitting against the faces of the teeth of said wheels and pierced by holes forming ducts which establish communication between diagonally opposite corners, substantially as described.

4. In an automatic brake for compensation gear wheels of an automobile, in combination with said gear wheels, a housing inclosing the same and provided with oil ducts, the outer terminals of which are nearer to the axis of rotation of the housing than the inner terminals thereof, and guards closely fitting against the faces of said gear wheels, the said guards having the object of entrapping oil between the intermeshing teeth of said wheels.

HUGO BILGRAM.

Witnesses:
 JOHN A. WIEDERSHEIM,
 N. BUSSINGER.